United States Patent [19]
Holmes et al.

[11] 3,769,142
[45] Oct. 30, 1973

[54] NON-WOVEN LOCKED PLY COMPOSITE STRUCTURE

[75] Inventors: Richard N. Holmes, Glendale; Richard A. Dobbs, Orange, both of Calif.

[73] Assignee: McDonnell Douglas Corporation, Santa Monica, Calif.

[22] Filed: Dec. 4, 1970

[21] Appl. No.: 95,113

[52] U.S. Cl............ 161/53, 89/36, 161/59, 161/112, 161/143
[51] Int. Cl......... B32b 7/08, B32b 5/12, F41h 5/00
[58] Field of Search ............ 161/50, 53, 59, 55, 161/111, 96, 48, 109, 142–143, 112; 181/33 R; 89/36 A

[56] References Cited
UNITED STATES PATENTS

| 2,789,076 | 4/1957 | Frieder et al. | 161/53 |
| 2,562,951 | 8/1951 | Rose et al. | 161/55 X |
| 3,647,606 | 3/1972 | Notaro | 161/53 X |
| 3,203,849 | 8/1965 | Katz et al. | 161/96 |
| 2,778,761 | 1/1957 | Frieder et al. | 161/53 X |
| 2,705,692 | 4/1955 | Petterson | 161/55 X |

Primary Examiner—Philip Dier
Attorney—Walter J. Jason, Donald L. Royer and Robert O. Richardson

[57] ABSTRACT

A non-prebuckled fibrous composite structure with multiple plies interlocked with vertical fiber locks through the plies to improve interlaminar shear characteristics of the composite structure.

3 Claims, 5 Drawing Figures

PATENTED OCT 30 1973 3,769,142

INVENTORS
RICHARD N. HOLMES &
RICHARD A. DOBBS
By Robert O. Richardson
-ATTORNEY- INVENTORS
RICHARD N. HOLMES &
RICHARD A. DOBBS
BY Robert O.
Richardson
-ATTORNEY-

NON-WOVEN LOCKED PLY COMPOSITE STRUCTURE

BACKGROUND OF THE PRESENT INVENTION

Aluminum has long been a recognized basic ideal metal in the building of aircraft inasmuch as it was light in weight and was of high strength. However, industry is continually looking for even better materials and is seeking to replace aluminum in many aircraft parts. Titanium is a metal that appears to be most promising as a replacement. It is somewhat lighter from a strength-to-weight ratio but, in addition, is able to withstand higher temperatures up around the range of 450°–500°F in continuous operation. This makes titanium preferable in supersonic transport flight or for military aircraft operating in this temperature range. The biggest disadvantage at the moment is in the forming of titanium, since it is crack-sensitive which makes it very difficult to form. Titanium presently is formed with a heated tool technique which makes it very costly. Other materials are also under consideration. Beryllium is another metal that has been considered. It is very light in weight, has a very high modulus of elasticity, which gives it a high stiffness. However, it is very brittle and its fatigue life properties are very poor.

Since there appears to be no ideal metal that meets all of the future anticipated requirements of the aerospace industry, interest has been developed in the high modulus fibrous composites. Tungsten wire, coated with boron, encapsulated in a resin system creates an excellent high modulus material. High modulus, in this sense, means "high bending stiffness" or "resistance to bending." The disadvantage of this composite is that high stresses are introduced when the material is formed because of the great resistance of the individual fiber stiffness of the tungsten wire. The present high cost is not likely to diminish greatly because of the high cost of the tungsten wire.

Carbon and/or graphite fibers appear very attractive as a future aerospace material. The present high cost is due to low volume production and its cost will undoubtedly diminish greatly when production is established on the volume order of aluminum, for example, because of the availability of the base material and its low cost. For example, rayon fibers, prevelant in the clothing industry, can be carbonized or graphitized. This is done by subjecting the fibers to heat and pressure and continuing the process until it reaches either the carbonization or graphitization stage. Carbonization occurs at about 3,200°–3,600°F and graphitization in the area of 4,600°–5,200°F temperature. The rayon must be gradually subjected to increased temperatures over a period of time on the order of 36 hours. At present, this is done at vacuum pressure condition, although some experimental work is now being done at atmospheric conditions. While at the moment rayon appears to be the best fiber for this purpose, all fibers having a carbon molecular system are candidates for carbonization or graphitization. Fiberglass, of course, is not a good candidate since it will always melt when it reaches its critical temperature in the area of about 1,100°F. However, some synthetic fibers, such as polyethylene (like the plastic bags in super markets) in fiber form and under experimentation for graphitization.

Normally, the carbonization or graphitization of fibers is done in a single-thread form and then it is wound on a spool. It is then ready for weaving into a cloth form or of a plied tape resin layup. In tape form the fibers of the tape all run in a single direction in which it has great strength. In its lateral direction it has low strength characteristics. The strength of these fibers, typically, ranges from 2 to 18 pounds, full strength, in single-thread form. Each thread can be made into cable form of many strands for additional strength, as desired. From this stage to a finished article requires resin preimpregnation, forming it over a mold and subjecting it to a heat cure cycle to provide the stiffened finished part. Many such techniques are well known in the industry. For an example of resin preimpregnation, reference is made to our U.S. Pat. No. 3,481,427 issuing 2 Dec. 1969 for Acoustical Panel Structure. In the multi-ply lamination of a structural part, each of the layers of tape singly possesses great strength and collectively provide a high strength part, particularly under tension.

The problem for which the present invention is a solution can best be understood by analogy with reference to plywood in which sheets of thin layers of wood are glued together to make a plywood panel. An examination of old or weathered plywood will reveal that the glue has failed and the layers or plies have become separated. Both the appearance and the strength of the plywood has deteriorated. Along the plane of the plywood panel, however, each of the plies are individually strong in tension and there is no shear force on the glue. However, if a force is applied on one surface of the plywood in a first direction and force is applied on the other surface of the plywood in the opposite direction, the bonding strength between the several layers is then subjected to an interlaminar shear force and the old glue will not hold and the panel comes apart.

Similarly, when we have a composite material consisting of multiple plies, only the resin between the plies performs the function of the glue in the plywood. The typical bonding resin has a tensile strength of only about 2,000 psi, whereas the fibrous systems in a tape lay-up has a tensile strength on the order of 180,000 psi. The problem therefore is to increase the interlaminar shear strength between the plies so that the part will have substantially the same strength between plies as along the plane of the plies. This is done in the present invention by providing a mechanical lock between the plies. It is in the fabrication of a multi-layer composite that will resist the shearing tendencies of the bonding material that is the principle advantage of the composite structure developed in the present invention. An especially attractive advantage in this kind of structure is that it will increase bolt bearing strength. Attachment points on the structure are no longer its weakest points.

SUMMARY OF THE PRESENT INVENTION

This invention relates to the fabrication of a locked ply integral composite structure to improve structural strength between plies. The composite structure may be a face sheet, sandwich material, or any structural load bearing part. This is done in the stage where the fibers are strung in the jig with each ply of fibers oriented in the direction desired. Mechanical fiber locks are then installed between the intersections of overlapping layers of straight or non-prebuckled fibers. One manner of doing this is to simply lay up multiple plies of tape with the tape fibers oriented in the position of expected loading. Individual mechanical fiber locks are then inserted through the layers. Thereafter, the composite is ready for fabrication into a usable part. In another form, instead of using tape plies, the plurality of spaced side-by-side continuous fibers are placed in a plane, subsequent planes of fibers (or plies) are stacked, again in the orientation desired, after which the mechanical locks are then installed. Not every intersection need be mechanically locked, but the structure may be interlocked in this manner where the increase in structural strength is desirable. Before the locks are secured, the spaced fibers in each of the planes are moved together to reduce the size of the openings between the adjacent fibers when high fiber density is desired. When used for acoustic purposes the fibers are spaced accordingly to create the desired porosity. Thereafter the locks are tied to form a plurality of individual loops of fiber locks, mechanically interconnecting the plurality of layers of fibers. The following steps of fabrication to a finished part are conventional and well known.

Figure 1:
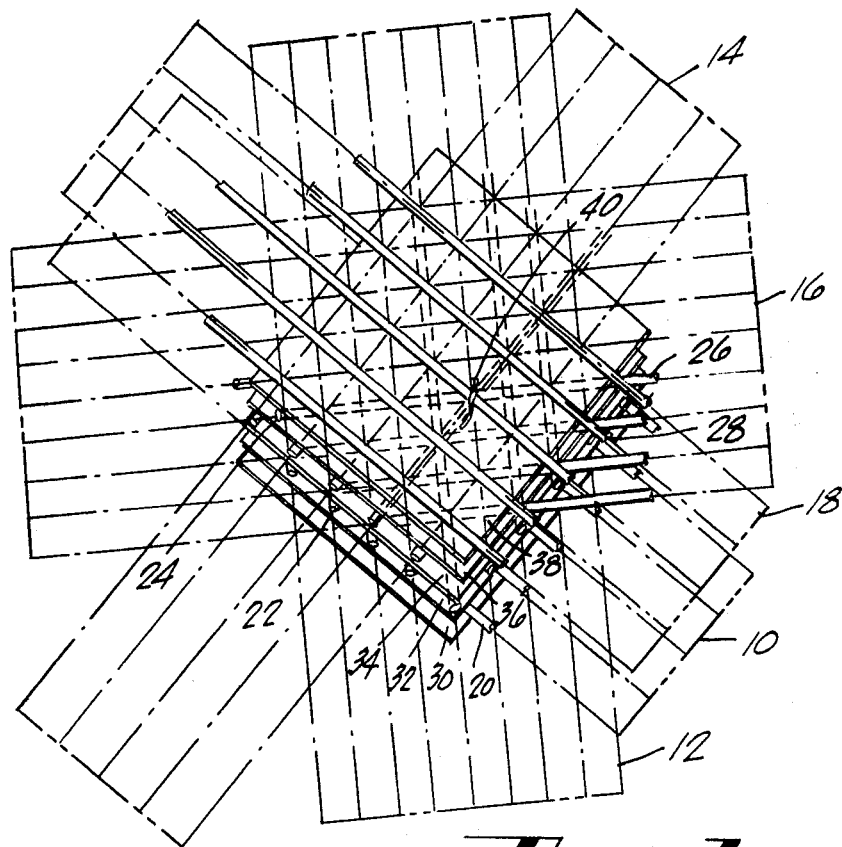
FIG. 1 is a schematic illustration of stacked multiple plies of fibers in the expanded position for locking.

Reference is now made to FIG. 1 wherein there is shown a plurality of plies 10, 12, 14, 16 and 18, each consisting of a plurality of continuous fibers, uniformly spaced in the plane. Fibers in ply 10 are identified as 20, fibers in ply 12 are identified as 22, fibers in ply 14 are identified as 24, fibers in ply 16 are identified as 26, and fibers in ply 18 are identified as 28. Plane lines 30, 32, 34, 36 and 38 are not really part of the structure but are shown in FIG. 1 simply to show the separation of the plies as they are stacked, one on top of the other in the formation of a three-dimensional grid. The fibers in these plies are appropriately positioned in a jig and held in position in the various planes by tension. The lateral spacing of the fibers in each of the plies are spaced apart slightly more than they will be in the final product to permit the insertion of mechanical ply locks at their vertical intersections. One such ply lock is shown and identified as 40. In composites where it is desired to have a greater density of the fibers in the matrix, the spacing of the fibers may be closed up after the lock has been applied.

Figure 2:
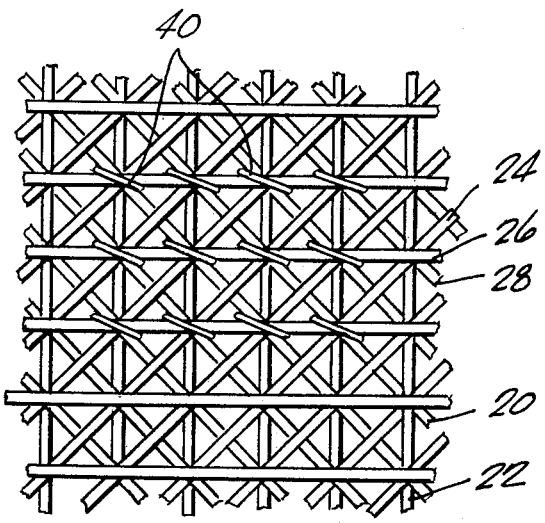
FIG. 2 is a plan view showing the various plies of fibers extending in various directions and with some of the intersections having fibrous ply locks in position.

Reference is now made to FIG. 2 which is an enlarged plan view of a portion of FIG. 1. Here is shown the vertical intersections of the fibers 20, 22, 24, 26 and 28 as they are oriented in the different directions. The fibers 20 and 28 are in the same direction but in a different layer of plies, all in a manner similar to that shown in FIG. 1. For example, starting from the bottom, there is shown fibers 20. The layer next to the bottom is shown by fibers 22, the layer in the middle is shown by fibers 24, the layer second from the top is shown as fibers 26, and the top layer of fibers is shown as 28. Fibrous ply locks 40 at the crossover intersection of fibers in the various planes securely retain the multiple plies together. The locks involve a loop and tie technique wherein the individual loops become separate continuous loops.

Figure 3:
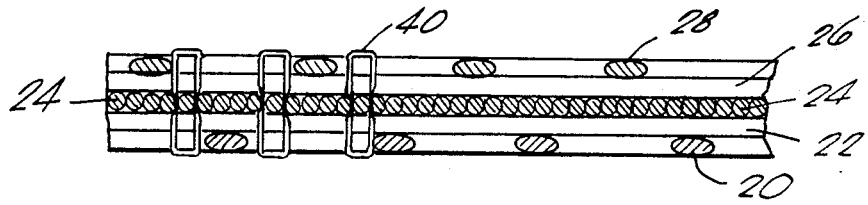
FIG. 3 is an elevational view shown in cross section to illustrate the multiple layers interlocked.

Reference is now made to FIG. 3 wherein a composite panel is shown made of five plies of fibers 20, 22, 24, 26 and 28 as in FIG. 1. These plies are oriented in various directions to provide a uniform directional strength. Fiber locks 40 extend through the five plies at the crossover intersections of the fibers. These individual locks, provided in this manner, has an advantage over a continuous fiber stitching through the plies in that the locks are discontinuous so that the locks will not be subjected to in-plane loading, such as tension or compression forces, for example.

Figure 4:
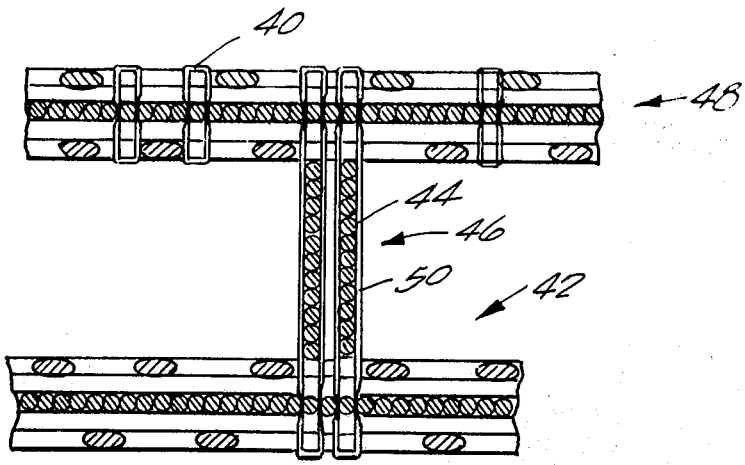
FIG. 4 is an elevational view in cross section of two face panels joined by an integral web to create a sandwich type structure.

In FIG. 4 there is shown a sectional view of a three-dimensional integral non-woven structure wherein the faces are integrally joined by extension of the ply locks in the web area. In one method of making the composite shown in FIG. 4, the fibers of the bottom panel 42 are first positioned in a locating fixture after which the fibers 44 of the web 46 are next located. Thereafter the plies of top panel 48 are placed in position. The ply locks 40 extend through the multiple plies in the top panel 48 in the manner previously described. The web locks 50 are continuous from the front face to the back face and support the interconnecting plies of longitudinal web fibers 44.

Figure 5:
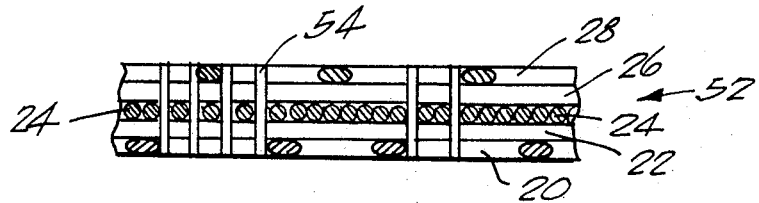
FIG. 5 is an elevational cross sectional view of an alternate form wherein the mechanical locks are in pin form instead of in connected loops.

An alternate form of ply lock is shown in the sectional view in FIG. 5. Here is shown a five ply composite structure 52 having the five plies 20, 22, 24, 26 and 28 as before. Instead of using the loop and tie technique, as shown by the locks 40 in the previous form, the locks 54 are shown in pin form in which there is no loop across the top and bottom plies for each pin.

Once the locks have been applied to the fiber plies the fibrous material is ready for resin preimpregnation. Thereafter it is molded to a shaped part and cured, all in a well known manner.

Having thus described alternate forms of illustrative embodiments, it is to be understood that further modifications will readily occur to those skilled in the art and that it is to be understood that these modifications are to be considered as part of the present invention as claimed.

We claim:

1. A composite structure comprising a plurality of plies of continuous elongated straight fibers, said plies being stacked in planar relationship, one on top of the other, to form a three-dimensional grid, said plies being oriented in various directions, said plies having crossover intersections of fibers fiber ply locks extending through said piles, within openings of said grid, and normal to the planes of said plies, said locks being looped and tied around the fibers of the various plies at their intersections.

2. A composite structure as in claim 1 wherein each crossover intersection has an individual lock spaced and separate from the locks of adjacent crossover intersections.

3. A composite structure as in claim 1 wherein said fibers are pre-impregnated with a plastic resin system for subsequent curing into a rigid structure.

* * * * *